A. L. STREETER.
BRAKE SHOE.
APPLICATION FILED FEB. 18, 1915.
1,142,380.
Patented June 8, 1915.
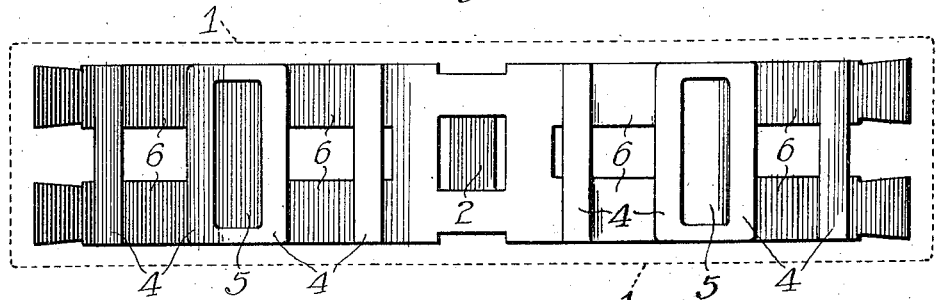
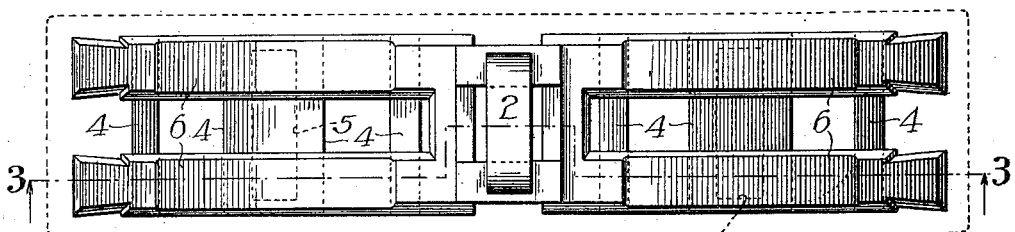
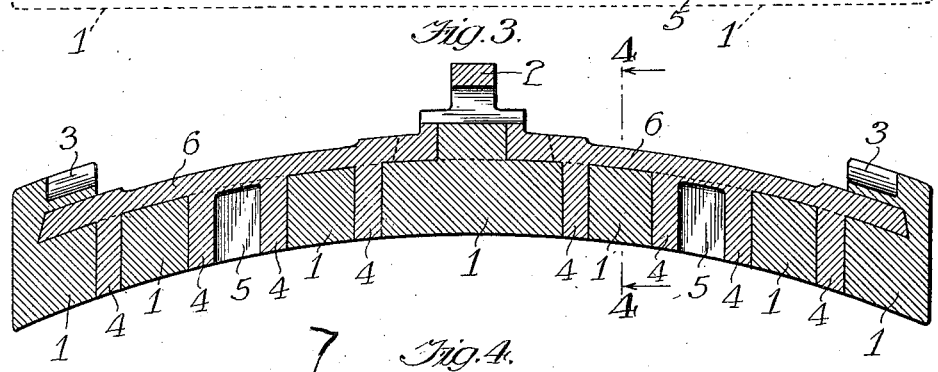
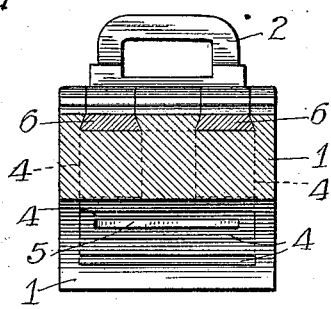
Witnesses
Martin H. Olsen.
S. A. Hawkins.
Inventor
Alfred L. Streeter

UNITED STATES PATENT OFFICE.

ALFRED L. STREETER, OF CHICAGO, ILLINOIS.

BRAKE-SHOE.

1,142,380.

Specification of Letters Patent. Patented June 8, 1915.

Application filed February 18, 1915. Serial No. 8,986.

*To all whom it may concern:*

Be it known that I, ALFRED L. STREETER, a citizen of the United States, and a resident of Chicago, in the county of Cook and State of Illinois, have invented certain new and useful Improvements in Brake-Shoes, of which the following is a specification.

This invention relates to brake shoes.

The object of the invention is to provide means in a brake shoe for increasing the friction of the shoe, whereby a desired braking action can be obtained with the application of insufficient braking power to "skid" the car wheels, thus increasing the life of both the shoes and of the car wheels and also preventing flat wheels due to skidding.

To this end a brake shoe of my invention comprises the various features and details of construction hereinafter described and claimed.

In the accompanying drawing, in which my invention is fully illustrated, Figures 1 and 2 are, respectively, a face view and a back view of a brake shoe of my invention, the insert being shown in full lines and the body portion in dotted lines. Fig. 3 is a longitudinal sectional view of a brake shoe of my invention on the line 3—3 of Fig. 2; and Fig. 4 is a transverse sectional view thereof on the line 4—4 of Fig. 3.

Referring now to the drawings, 1 designates the body portion of the brake shoe, which is provided with usual attaching and guide lugs 2 and 3.

The body portion of the shoe is made of soft granular material, preferably gray cast iron, and secured therein are inserts 4 made of soft tough metal, preferably malleable iron. As shown, said inserts consist of flat blocks disposed edgewise and which extend transversely of and practically entirely through the shoe from face to back thereof.

Formed in the face of the shoe are recesses 5, the inner ends of which are closed and which preferably extend into close proximity to the back of the shoe. As shown, there are two recesses 5, located symmetrically on opposite sides of the longitudinal center of said shoe, said recesses being preferably formed directly in two of the inserts 4.

In the preferable construction shown, also, I have shown my invention embodied in a brake shoe having a reinforcing plate secured in the back thereof, said reinforcing plate consisting preferably of rigidly connected spaced bars 6 dovetailed into the back of the brake shoe, said reinforcing back being preferably made of malleable iron and being cast integral with the attaching lug 2 and the inserts 4.

In use, the granular gray iron forming the body portion of the shoe will be worn or ground off by the friction to which the shoe is subjected and the fine particles thereof will become embedded in the soft tough inserts 4, which will thus form a roughened surface somewhat resembling fine emery cloth, which when the brakes are applied will grip or bite into the tread of the wheel with a very strong engagement, which will operate to effectively brake the wheel with a relatively light pressure. Most of the surplus granules or particles worn off from the body portion of the shoe will be deposited into the recesses 5, from which they will work out between the tread of the wheel and the face of the brake shoe, the movement of the wheel operating to carry such granules or particles along the face of the shoe onto the faces of the inserts 4, into which they will become embedded and held, said surplus granules, with those worn off at each application of the brakes, operating to keep the faces of said inserts fully covered or impregnated therewith and insuring maximum braking efficiency.

While I prefer the form of brake shoe shown, comprising a reinforcing back with attaching lug and inserts formed integral therewith or rigidly connected thereto, I do not desire to limit myself thereto, as my invention contemplates equally the use of inserts of any desired shape supported in any desired manner either with or without a reinforcing back.

A further important advantage in the use of my improved brake shoes is that glazing of the brake shoes is effectually prevented, thereby further increasing the braking effect thereof and correspondingly reducing the braking power required in the application of the brakes.

I claim:—

1. A brake shoe comprising a body portion of granular material and inserts of soft, tough metal secured in the face or friction surface thereof, said brake shoe being provided in its face or friction surfaces with a closed recess or recesses, substantially as described.

2. A brake shoe comprising a body portion of granular material and inserts of soft, tough metal secured in the face or friction surface thereof, said brake shoe being provided in its face or friction surface with a closed recess or recesses, said inserts and recess or recesses extending transversely of said brake shoe and to within a short distance of the lateral edges thereof, substantially as described.

3. A brake shoe comprising a body portion of granular material and inserts of soft, tough metal secured in the face or friction surface thereof, and comprising an insert or inserts provided with a closed recess in its face or friction surface.

4. A brake shoe comprising a body portion of soft, granular metal and inserts of soft, tough metal secured in the face or friction surface thereof, said brake shoe being provided in its face or friction surface with a closed recess or recesses, substantially as described.

5. A brake shoe comprising a body portion of soft, granular metal, and inserts of soft, tough metal secured therein and comprising an insert or inserts provided with a closed recess in its face or friction surface, substantially as described.

6. A brake shoe comprising a body portion of gray cast iron, a reinforcing back dovetailed into the back thereof, inserts secured in the face or friction surface of said shoe, said reinforcing back and inserts being made of malleable iron cast integral with each other, and said inserts comprising an insert or inserts provided with a closed recess in the faces or friction surfaces thereof, substantially as described.

In testimony that I claim the foregoing as my invention, I affix my signature in the presence of two subscribing witnesses this 16th day of February, 1915.

ALFRED L. STREETER.

Witnesses:
ALEX D. KING, Jr.,
F. M. REICHEL.

Copies of this patent may be obtained for five cents each, by addressing the "Commissioner of Patents, Washington, D. C."